March 29, 1955     I. J. PEARSON     2,705,032
CUTTER GUIDING DEVICE
Filed June 30, 1953
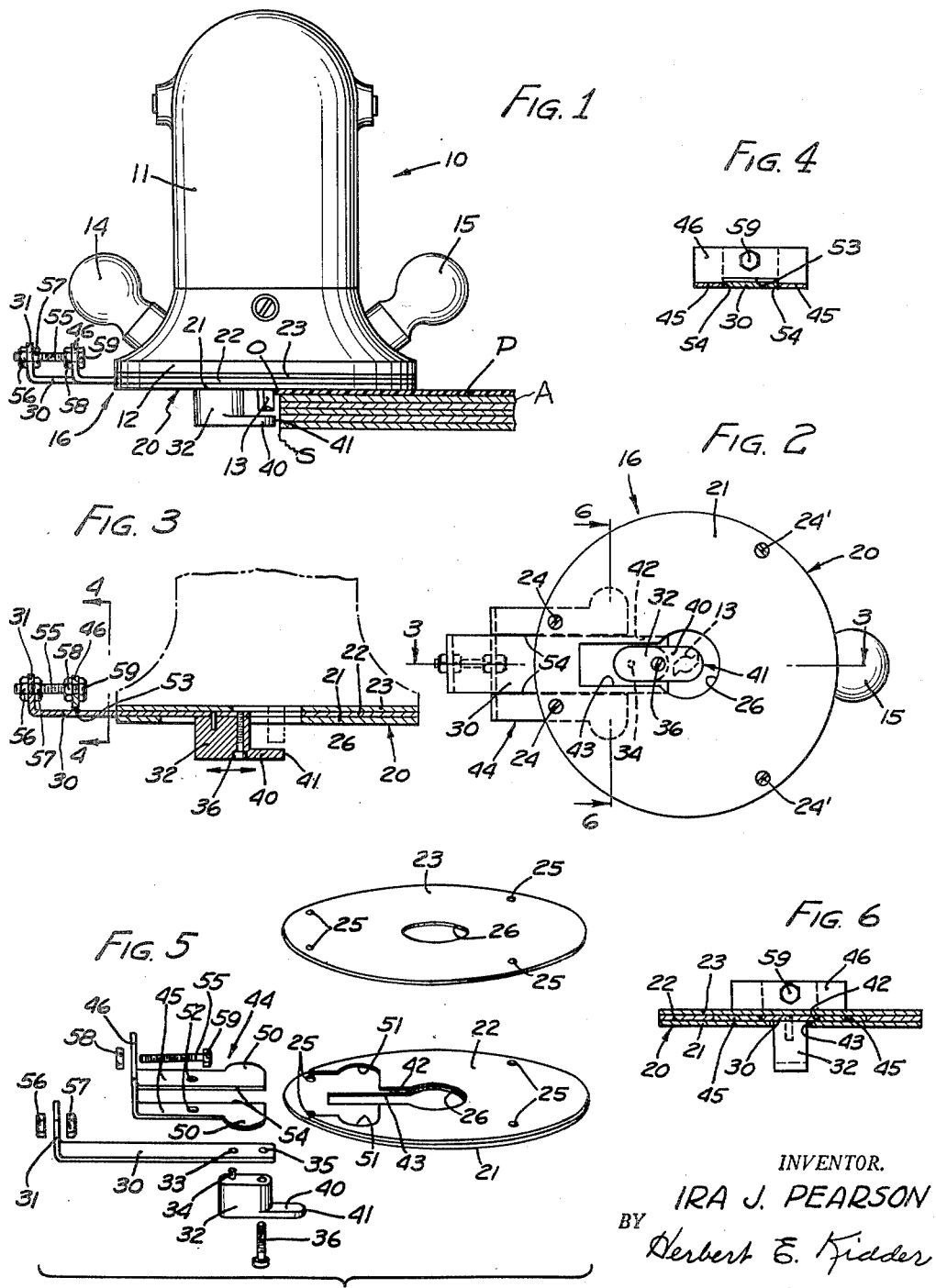
INVENTOR.
IRA J. PEARSON
BY Herbert E. Kidder
AGENT

United States Patent Office 2,705,032
Patented Mar. 29, 1955

2,705,032

CUTTER GUIDING DEVICE

Ira J. Pearson, Riverside, Calif.

Application June 30, 1953, Serial No. 365,022

8 Claims. (Cl. 144—134)

The present invention relates generally to tool guiding devices, and more specifically to a device adapted for use with a portable router or similar power tool to guide the cutter accurately with respect to a reference surface underneath a work panel on which the tool is resting.

In making furniture or cabinets surfaced with high pressure laminates, it is customary to assemble the work with the laminate panel overhanging a finished edge; after which the overhang is trimmed off flush with the said finished edge. This trimming operation is usually performed by a portable router having a flat base that rests on the surface of the laminate panel being trimmed. A cutter projecting below said base mills away the edge of the laminate. The cutter must be accurately guided with respect to the finished edge or surface underneath the overhanging laminate, so that the laminate panel is cut off smoothly flush with the reference surface. The cut edge should be neither above nor below the reference surface, but should blend in so smoothly therewith as to leave a finished surface without noticeable discontinuities.

A primary object of the invention, therefore, is to provide a new and improved tool of the class described, having means in the form of a guide finger or the like extending below the bottom end of the cutter to engage the finished reference edge below the panel being trimmed, so as to guide the cutter. A more specific object is to provide means for obtaining a micrometer adjustment of the position of the guide finger with respect to the cutter, so that suitable compensating adjustment, measured in thousandths of an inch, may be made in the event that the cutter is found to be cutting above or below the reference surface.

A further object of the invention is to provide a tool of the class described, wherein all of the adjustments and structure relating to the guiding device, except for the guide finger itself and supporting member therefor, are disposed above the bottom surface of the base plate on which the machine rests, where they are out of the way of the work. This feature facilitates working inside restricted areas, where small cutouts and other details in the reference surface prevent the use of bulky structure or adjustment mechanisms in the cutting area.

Another object of the invention is to provide a device which may take the form of an attachment that is mounted on any make or model of router without structural modification of the tool to convert the same for guided trimming of overhanging laminate panels.

A further object of the invention is to provide a tool guiding device which is light in weight, and which is quickly and easily removable from the tool; both features being important in hand tools. Another feature of importance is that the adjustments of the cutter guide do not interfere with normal use of the tool.

Still another object is to provide a cutter guide for portable routers and the like, wherein the guide finger may be removed to permit use of the router in the conventional manner, and then replaced without change in adjustment.

These and other objects and advantages of the invention will become apparent to those skilled in the art upon consideration of the following detailed description of the preferred embodiment thereof, reference being had to the accompanying drawings, wherein:

Figure 1 is a side elevational view of a portable router having a cutter guide attachment mounted thereon embodying the principles of my invention;

Figure 2 is a bottom view of the same;

Figure 3 is a sectional view through the cutter guide attachment, taken at 3—3 in Figure 2;

Figure 4 is a sectional view taken at 4—4 in Figure 3;

Figure 5 is an exploded perspective view of the cutter guide attachment; and

Figure 6 is a sectional view taken at 6—6 in Figure 2.

In the drawings, the portable router is indicated in its entirety by the reference numeral 10, and is seen to comprise a generally cylindrical housing 11 having a round, flat-bottomed base 12 at one end thereof. Projecting from the bottom end of the housing is a rotary cutter tool 13, which is driven by a motor within the housing. A pair of handles 14 and 15 project from the base 12 at opposite sides thereof, and the tool is manipulated manually by means of these handles.

The cutter guide attachment of the present invention is designated generally at 16, and comprises a base plate 20 made up of three layers 21, 22, and 23. The bottom layer 21 is preferably made of high pressure laminate, which is relatively hard and wear resistant, smooth-surfaced, and not likely to mar the high pressure laminate panel P that is the work piece. The panel P is cemented to a backing panel A of plywood or the like, with a certain amount of overhang projecting beyond the laminate edge strips S, as shown at O in Figure 1.

The second and third layers 22 and 23 of the base may be made of low pressure laminate, and the three layers are secured together and attached to the base 12 of the router by means of four screws 24, 24' (Fig. 2) extending through aligned screw holes 25 in the three layers of the base plate 20. The three layers of the base plate 20 are also apertured centrally at 26, and the cutter 13 passes downwardly through this aperture.

A slide 30 is mounted on the base plate 20 for movement toward and away from the cutter 13 in a plane parallel to the bottom surface of the base plate. The slide 30 may conveniently be formed from a flat strip of metal, one end of which is bent up at right angles to form an upturned flange 31. The other end of the strip, adjacent the cutter, has an L-shaped member 32 detachably secured to the underside thereof, and to that end it is drilled at 33 to receive a pin 34, and drilled and tapped at 35 to receive a machine screw 36.

The L-shaped member 32 extends downwardly from the slide 30 and has an elongated horizontal section, rounded at both ends, with substantially the same dimension in width as the diameter of the cutter 13. Projecting forwardly from the bottom edge portion of the member 32 is a relatively thin, flat finger 40 that extends under the cutter 13. The end of the finger 40 is rounded in a half-circle of substantially the same radius as the radius of the cutter, and the contact tip 41 of the finger is tangent to a vertical plane that is tangent to the cylindrical surface generated by the cutting edge of the cutter 13. Thus, the cutter 13 cuts in the same vertical plane as the contact tip 41 of the finger, and by moving the router in toward the right, as seen in Figure 1, the cutter trims away the overhanging panel edge O until the contact finger 41 touches the reference surface S.

The L-shaped member 32 is adjustable toward and away from the cutter to compensate for variations in cutter diameter owing to different size cutters or to reduction of diameter by grinding. Adjustment is obtained by shifting the slide 30, as will now be described. The slide 30 is slidably confined between the top and bottom layers 23 and 21 of the base plate 20, within a slot 42 in the center layer 22. The bottom layer 21 is likewise slotted at 43 to provide an opening through which the member 32 projects. Both of the slots 42 and 43 open into the central aperture 26 and extend radially therefrom. The top slot 42 is slightly wider than the bottom slot 43, and is of the same width as the slide 30. The slide 30 is supported along its edges by the shoulder formed by the bottom layer 21, and is confined by the edges of the slot 42 against lateral movement, and by the top and bottom layers 23, 21 of the base plate against vertical movement.

The slide 30 is also slidably engaged along its edges by a slotted member 44, which is similarly confined between the top and bottom layers of the base. The member 44 is a generally U-shaped piece of flat metal, consisting of two laterally spaced, parallel arms 45 which are connected by a cross piece 46, the latter being bent upwardly at right angles to form an upturned flange parallel to the flange 31 and spaced inwardly therefrom. Both of the arms 45 have laterally outwardly projecting ears 50 at their outer ends, which are received within correspondingly shaped cut-outs 51 in the center layer 22 of the base plate. These ears 50 lock the member 44 into the base plate 20, and prevent the member from being pulled out of its place. Screw holes 52 in the arms 45 allow the screws 24 to pass through the arms.

The cross piece 46 is raised slightly, as shown in Figures 3 and 4 to provide clearance at 53 for the slide 30. The slide 30 is also slidably engaged along its edges by the adjacent edges 54 of the arms 45, and is guided thereby in its adjustment travel.

Adjustment of the slide is accomplished by means of an adjusting screw 55 extending through aligned apertures in the flanges 31 and 46. Nuts 56 and 57 are screwed onto the screw 55 on opposite sides of the flange 31, and clamp the latter securely between them. Another nut 58 is screwed onto the screw 55 and engages the left-hand side of flange 46, while the head 59 of the screw engages the right-hand side thereof. The two flanges 31, 46 are thus locked with respect to one another by the screw 55 and nuts 56, 57, 58, thereby maintaining the adjustment of the slide 30 and its attached finger 40.

In the use of the machine, the router 10 is set down on the panel P, with the cutter 13 clear of the overhanging edge. The router is next moved in toward the work until the contact tip 41 of the finger engages the finished surface S below the laminate panel P. The router is then moved around the entire edge of the work, and held with the tip 41 engaging the surface S, which causes the cutter 13 to mill away the overhanging edge O flush with the surface S.

To adjust the position of the finger 40, 41 to the right, the nut 57 is backed off a few turns, and nut 56 advanced until tests show that the proper adjustment has been made. The nut 57 is then tightened up again, and the tool is ready to use. To adjust the finger to the left, nut 56 is backed off and nut 57 is tightened; after which, nut 56 is drawn up tight against the flange. Since the adjustment is made by turning a nut on a screw, extremely fine adjustments may be made, measured in thousandths of an inch.

If it is desired to remove the entire cutter guiding device, it is necessary only to loosen the four screws 24, 24', which permits the base plate 20 and all attached parts to separate from the router.

If it should be necessary to remove the member 32, so that the router can be used in a conventional manner, it is necessary to remove only the one screw 36. The member 32 can later be replaced on the slide 30 without disturbing the original adjustment.

While I have shown and described in considerable detail what I believe to be the preferred form of my invention, it will be understood that various changes may be made by those skilled in the art without departing from the broad scope of the invention, as covered by the appended claims.

I claim:

1. An attachment for use with a portable power tool for cutting away the overhanging edge of a panel flush with a finished edge below said panel, said tool having a body, with a rotary cutter projecting from one end thereof, said attachment comprising a base detachably secured to said one end of said body, said base having an aperture formed therein through which said cutter projects, a slide mounted on said base for movement toward and away from said cutter in a plane generally parallel to the bottom surface of said base, said slide being disposed entirely above the bottom surface of said base guide means on the end of said slide adjacent said cutter projecting under the bottom end of said cutter to engage said finished edge below said panel, and an adjusting screw disposed above said base and connected between said base and said slide for adjusting the position of said guide means with respect to said cutter.

2. An attachment for use with a portable power tool for cutting away the overhanging edge of a panel flush with a finished edge below said panel, said tool having a body, with a rotary cutter projecting from one end thereof, said attachment comprising a base detachably secured to said one end of said body, said base having an aperture formed therein through which said cutter projects, a slide mounted on said base for movement toward and away from said cutter in a plane generally parallel to the bottom surface of said base, said slide being disposed entirely above the bottom surface of said base and being guided by said base, a downwardly projecting member detachably secured to the end of said slide adjacent said cutter, said member including a finger projecting under the bottom end of said cutter to engage said finished edge below said panel, the end of said finger being disposed in the cutting plane of said cutter, said slide having an upturned portion on the end opposite said downwardly projecting member, and adjusting screw means on said base extending through an aperture in said upturned portion of said slide for adjusting the position of said finger with respect to said cutter.

3. An attachment for use with a portable power tool for cutting away the overhanging edge of a panel flush with a finished edge below said panel, said tool having a body, with a rotary cutter projecting from one end thereof, said attachment comprising a base detachably secured to said one end of said body, said base having an aperture formed therein through which said cutter projects, a slide mounted on said base for movement toward and away from said cutter in a plane generally parallel to the bottom surface of said base, a member attached to said base and having laterally spaced parallel sides engaging the side edges of said slide to guide the same, said member including an upturned flange having an aperture formed therein, an upturned, apertured flange on said slide, an adjusting screw extending through the apertures of said flanges and operatively connected therewith by threaded means providing extremely fine adjustment of said slide with respect to said cutter, and a downwardly projecting part on the end of said slide adjacent said cutter, said part having a finger extending under the end of said cutter and engaging said finished edge below said panel.

4. An attachment for use with a portable power tool for cutting away the overhanging edge of a panel flush with a finished edge below said panel, said tool having a body, with a rotary cutter projecting from one end thereof, said attachment comprising a base detachably secured to said one end of said body, said base having an aperture formed therein through which said cutter projects, a slide mounted on said base for movement toward and away from said cutter in a plane generally parallel to the bottom surface of said base, a downwardly projecting member detachably secured to the end of said slide adjacent said cutter, said member including a finger projecting under the bottom end of said cutter to engage said finished edge below said panel, the end of said finger being disposed in the cutting plane of said cutter, a slotted plate attached to said base and having laterally spaced parallel edges engaging the sides of said slide to guide the same, said plate including an upturned flange having an aperture formed therein, an upturned, apertured flange on said slide, an adjusting screw extending through the apertures of said flanges, and a plurality of lock nuts on said screw engaging said flanges on opposite sides thereof to provide fine adjustment of said slide with respect to said cutter.

5. In a portable tool for cutting away the overhanging edge of a panel flush with a finished edge below said panel, said tool having a base that rests on the top surface of said panel, and a rotary cutter projecting downwardly from said base, a slide supported for movement toward and away from said cutter in a plane parallel to the bottom surface of said base, a slotted plate attached to said base and having laterally spaced parallel edges engaging the sides of said slide to guide the same, said plate including an upturned flange having an aperture formed therein, an upturned, apertured flange on said slide, an adjusting screw extending through the apertures of said flanges and operatively connected therewith by threaded means providing extremely fine adjustment of said slide with respect to said cutter, and a downwardly projecting part on the end of said slide adjacent said cutter, said part having a finger extending under the end of said cutter and engaging said finished edge below said panel.

6. In a portable tool for cutting away the overhanging edge of a panel flush with a finished edge below said panel, said tool having a base that rests on the top surface of said panel, and a rotary cutter projecting downwardly from said base, a slide supported for movement toward and away from said cutter in a plane parallel to the bottom surface of said base, a downwardly projecting member on the end of said slide adjacent said cutter, said member having a finger extending under the end of said cutter and engaging said finished edge below said panel, an apertured projection on said slide, another apertured projection on said base, and an adjusting screw extending through said apertures and connected to said projections by threaded means providing extremely fine adjustment of the position of said finger with respect to said cutter.

7. In a portable tool for cutting away the overhanging edge of a panel flush with a finished edge below said panel, said tool having a base that rests on the top surface of said panel, and a rotary cutter projecting downwardly from said base, a slide supported for movement toward and away from said cutter in a plane parallel to the bottom surface of said base, said slide being confined between and guided by parallel sides on said base, an L-shaped member detachably secured to the underside of said slide at the end adjacent said cutter, said member extending downwardly from said slide and having a horizontal arm extending under said cutter to engage said finished edge below said panel, said arm terminating in a rounded end tangent to the cylindrical surface generated by the cutting edge of said cutter, and an adjusting screw extending parallel to said slide above said base and connected between said base and said slide for adjusting the position of said horizontal arm with respect to said cutter.

8. In a portable tool for cutting away the overhanging edge of a panel flush with a finished edge below said panel, said tool having a base that rests on the top surface of said panel, and a rotary cutter projecting downwardly from said base, a slide supported for movement toward and away from said cutter in a plane parallel to the bottom surface of said base, a slotted plate attached to said base and having laterally spaced parallel edges engaging the sides of said slide to guide the same, said plate including an upturned flange having an aperture formed therein, an upturned, apertured flange on said slide, an adjusting screw extending through the apertures of said flanges and operatively connected therewith by threaded means providing extremely fine adjustment of said slide with respect to said cutter, and an L-shaped member detachably secured to the underside of said slide at the end adjacent said cutter, said member extending downwardly from said slide and having a horizontal arm extending under said cutter to engage said finished edge below said panel, said arm terminating in a rounded end tangent to the cylindrical surface generated by the cutting edges of said cutter.

References Cited in the file of this patent

UNITED STATES PATENTS

| | | |
|---|---|---|
| 1,464,351 | Casey | Aug. 7, 1923 |
| 1,532,683 | Carter | Apr. 7, 1925 |
| 1,654,786 | Carstens | Jan. 3, 1928 |
| 2,587,994 | Gregory | Mar. 4, 1952 |

FOREIGN PATENTS

| | | |
|---|---|---|
| 603,858 | France | Jan. 14, 1926 |
| 77,589 | Sweden | June 20, 1933 |